Patented Sept. 25, 1951

2,569,400

UNITED STATES PATENT OFFICE 2,569,400

ALKYLATION OF POLYSTYRENE USING A HYDROGEN FLUORIDE CATALYST

John Mann Butler, Dayton, Ohio, assignor to Monsanto Chemical Company, St. Louis, Mo., a corporation of Delaware No Drawing. Application May 27, 1948,
Serial No. 29,648

5 Claims. (Cl. 260—96)

This invention relates to a method of preparing alkylated polystyrene of high molecular weight. More particularly it relates to a method of improving alkylated polystyrene for use in modifying lubricating oils.

It is well known that polystyrene compositions may be alkylated by reaction with alkyl halides or olefinic compounds in the presence of Friedel-Craft catalysts. A wide variety of catalysts have been used, but many are objectionably expensive, others which are more readily available do not produce alkylated polystyrenes of optimum quality, and some are difficult to remove from the product. The preparation of alkylated polystyrenes with boron trifluoride is known, but such reactions are frequently difficult to control and non-reproducible results are frequently encountered. Aluminum trichloride is widely used as the alkylation catalyst, but the product so obtained is often degraded and the molecular weight decreased, unless special precautions are taken. In copending application Serial No. 670,041, filed May 15, 1946, by John M. Butler and Joachim Dazzi, there is described and claimed a method of preventing degradation during alkylation with aluminum chloride by conducting the reaction in the presence of organic nitro compounds.

The primary purpose of this invention is to provide a direct alkylation method through the use of an inexpensive and readily available catalyst, which method does not cause degradation of the polymer and its incident reduction in molecular weight. A further purpose of this invention is to provide a more useful alkylated polystyrene, and one which is especially effective in improving the viscosity index of lubricating oils.

It has been found that if polystyrenes are alkylated using hydrogen fluoride as the catalyst unusually effective products are obtained. Although hydrogen fluoride is well known as a Friedel-Craft catalyst, it produces a result quite different from that obtained by the prior art use of aluminum chloride, and other catalysts usually used in the preparation of alkylated polystyrene.

The alkylations are conducted in the manner well known to the prior art, except that hydrogen fluoride is used as catalyst for the reaction of the alkylating agent with the polystyrene in an inert solvent. Suitable alkylating agents are the olefinic hydrocarbons, such as propylene, isobutylene, cyclohexene, n-octadecene-1, polymeric propylene, polymeric butenes and other unsaturated hydrocarbons, the alkyl halides, such as propyl chloride, butyl chloride, isobutyl chloride, homologous chlorides of higher molecular weight containing up to 18 carbon atoms, and the corresponding fluorides, bromides and iodides; and the monounsaturated esters, such as methyl oleate, oleyl acetate, lauryl oleate, oleyl stearate and homologues thereof, especially those with a mono-unsaturated radical containing 8 to 20 carbon atoms.

The polystyrene used in the practice of this invention is that with molecular weight in excess of 10,000, and preferably in excess of 60,000. Very high molecular weight polystyrene, for example those in excess of 150,000, and up to 1,000,000, may be alkylated by this method and are useful in specialized applications.

The reaction is preferably conducted in the presence of a suitable solvent, for example nitro benzene, o-dichloro-benzene, chlorobenzene and ethylene dichloride. The quantity of solvent may vary widely, that amount being used which is necessary to produce a sufficient fluid reaction mass. More solvent is generally required in the alkylation of the higher molecular weight polystyrenes.

The alkylations are generally conducted by charging a reaction vessel with a solution of polystyrene and liquid hydrogen fluoride, and adding the alkylating agent while stirring efficiently to contact the organic phase with the hydrogen fluoride catalyst phase. The reaction is continued until sufficient alkylation has taken place to render the polystyrene soluble in the petroleum fraction to be modified. Preferred results and good solubility in petroleum fractions are obtained by the substitution of an average of from 4 to 20 aliphatic carbon atoms per styrene ring. After the desired degree of alkylation is achieved the hydrogen fluoride catalyst may be removed and recovered by distillation, and the polymer precipitated from the residual solution by mixing with alcohol, or other non-solvent for the alkylated polymer. If desired the alkylated polymer may be purified by resolution and reprecipitation. The polymer may also be obtained as a concentrated oil solution by adding the reaction mixture, after removal of hydrogen fluoride, to oil and distilling off the reaction solvent.

The alkylated polystyrenes prepared in accordance with this invention are not significantly degraded and are unusually effective in improving the viscosity index of lubricating oils, improving the tensile strength of waxes, and improving the "string" and "tackiness" of greases.

Further details of the practice of this inven-

Example 1

A 1000 gram lot of a 10 percent solution of 85,000 average molecular weight polystyrene in ethylene dichloride and 80 grams of liquid hydrogen fluoride were charged to a 1500 cc. stainless steel reactor fitted with an efficient agitator and an opening for charging. The temperature was held at 0 to 5° C. while 90 grams of a nonene fraction of olefins obtained by the polymerization of propylene were added over a period of two hours. Stirring was continued for an additional one and one-half hours. The hydrogen fluoride was removed and the polymer solution washed with water. The polymer was isolated by slowly adding the solution to a large excess of ethanol while stirring vigorously. One hundred seventy one grams of dry polymer were obtained.

Example 2

The alkylated polystyrene prepared in accordance with the preceding example was dissolved in a solvent refined, 20° F. pour, mid-continent oil to the extent of one percent, and a sample of alkylated polystyrene was also prepared from the same polystyrene using aluminum chloride as the alkylating catalyst. The following table demonstrates the measured viscosities at 100° F. and 210° F. on the untreated oil sample and the identical oil containing one percent of each of the alkylated polystyrenes.

|  | Vis. @ 100° F. | Vis. @ 210° F. | V. I. |
|---|---|---|---|
| Blank Oil | 27.94 | 4.93 | 110.9 |
| 1% AlCl₃ Alk | 29.11 | 5.28 | 126 |
| 1% HF Alk | 58.67 | 10.68 | 147 |

The above data demonstrate that polystyrene which has been alkylated by using hydrogen fluoride is much more effective than is the same polymer alkylated by means of aluminum chloride.

Although the invention has been described with respect to specific embodiments, it is not intended that the details thereof shall be construed as limitations upon the scope of the invention except to the extent incorporated in the following claims.

I claim:

1. A method of preparing alkylated polystyrene which comprises reacting polystyrene with a compound of the group consisting of hydrocarbon olefins, alkyl halides, and unsaturated aliphatic esters having a single olefinic double bond and containing only carbon, hydrogen and oxygen in the presence of hydrogen fluoride.

2. A method of preparing alkylated polystyrene which comprises contacting polystyrene with an olefinic hydrocarbon having from 3 to 30 carbon atoms in the presence of hydrogen fluoride.

3. A method of preparing alkylated polystyrene which comprises contacting polystyrene with an alkyl halide having from 3 to 30 carbon atoms in the presence of hydrogen fluoride.

4. A method of preparing alkylated polystyrene which comprises contacting polystyrene with an unsaturated ester having an unsaturated radical with from 8 to 20 carbon atoms, in the presence of hydrogen fluoride.

5. An alkylated polystyrene prepared by reacting polystyrene with a compound of the group consisting of hydrocarbon olefins, alkyl halides and unsaturated aliphatic esters having a single olefinic double bond and containing only carbon, hydrogen and oxygen in the presence of hydrogen fluoride.

JOHN MANN BUTLER.

REFERENCES CITED

The following references are of record in the file of this patent:

UNITED STATES PATENTS

| Number | Name | Date |
|---|---|---|
| 2,072,120 | Mikeska et al. | Mar. 2, 1937 |
| 2,456,435 | Matuszak | Dec. 14, 1938 |
| 2,459,636 | Fenney | Jan. 18, 1949 |

OTHER REFERENCES

Foster, The Oil and Gas Journal, Jan. 7, 1943.
Simons, article in Ind. Eng. Chem., vol. 32, pages 178–183.